Oct. 13, 1931.  M. F. CARR  1,826,705
RIVET
Filed Oct. 5, 1928
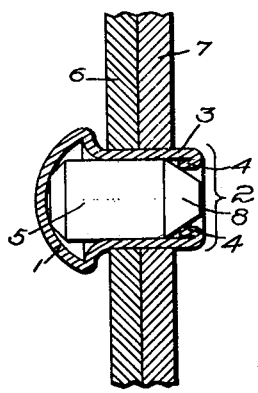
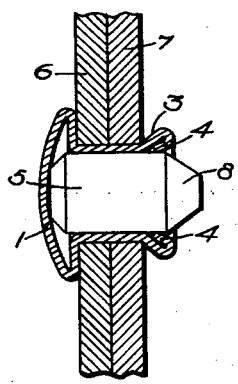
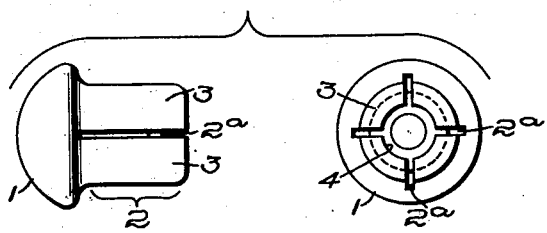
Inventor:
Moses F. Carr
by Emery, Booth, Janney & Varney
Attys Patented Oct. 13, 1931

1,826,705

UNITED STATES PATENT OFFICE

MOSES F. CARR, OF LEXINGTON, MASSACHUSETTS, ASSIGNOR, BY MESNE ASSIGNMENTS, TO UNITED-CARR FASTENER CORPORATION, OF CAMBRIDGE, MASSACHUSETTS, A CORPORATION OF MASSACHUSETTS

RIVET

Application filed October 5, 1928. Serial No. 310,660.

My invention aims to provide improvements in rivets.

In the drawings, which illustrate a preferred embodiment of my invention:—

Figure 1 is a section showing my improved rivet as it appears before being set to secure two plates together, the expanding element being shown in side elevation;

Fig. 2 is a section similar to Fig. 1, but showing the rivet after it has been set by a suitable tool; and Fig. 3 includes a side and an end elevation of the rivet.

Referring to the particular embodiment of my invention illustrated by the drawings, I have shown a simple, durable and inexpensive rivet which is particularly, though not exclusively, adapted for securing elements together where it is difficult or impossible to obtain access to one side of one of the elements.

The embodiment of my invention which I have elected to illustrate has a body part pressed or otherwise formed from sheet metal and has a hollow rounded collapsible head 1. The body part has also a shank portion 2 of smaller diameter than the head 1, as illustrated in Fig. 3. The shank 2 is divided by a number of slits 2a to provide a series of expansible fingers 3 having inturned portions 4 at their free ends surrounding an aperture at that end of the shank 2 opposite to the head 1.

Within the body part of the rivet, I have assembled an expanding element 5 having one end in contact with the head 1 and the other end tapered and contacting with the inturned portions 4, as best illustrated in Fig. 1.

For purposes of illustration only, I have shown (in Figs. 1 and 2) a rivet, formed as above described, securing two thin sheets 6, 7 of metal together. It should be understood, however, that a rivet embodying the features of my invention has many and varied uses. When securing the sheets 6 and 7 together, the shank of a rivet is pushed into previously formed holes in the sheets, as shown in Fig. 1. Then a suitable tool (not shown) exerts a crushing force against the head 1 of the rivet to collapse the head until it takes the shape shown in Fig. 2. As the head 1 collapses, the expanding element 5 is moved axially relative to the body part. During the axial movement of the element 5, the tapered end portion 8 thereof wedges against the inturned ends 4 of the fingers 3, thereby expanding those portions of the fingers 3 which extend through the plate 7, as clearly illustrated in Fig. 2.

My rivet is simple in construction, easy to apply and when applied presents a neat and finished appearance and therefore is adapted for many uses where other known rivets of the expanding type would fail.

While I have illustrated and described one embodiment of my invention, it should be understood that I desire to cover any rivet which embodies all the novel features of my invention and therefore reference is made to the following claims to indicate the scope of my invention.

Claims:

1. A rivet having a slit tubular shank portion, a hollow collapsible head portion adjacent to one end of said shank portion to close that end of the shank, inwardly bent means adjacent to the other end of said shank portion and independent shank-expanding means located within said rivet and held in assembled relation therewith by said head and said inwardly bent means whereby when said head is collapsed said shank-expanding means is forced against said inwardly bent means which in turn expands said shank.

2. A rivet comprising a body part formed of sheet metal and having an imperforate hollow collapsible head, a shank of smaller diameter than said head and extending from the under side thereof, an independent axially movable expanding element assembled within said rivet and having a tapered end and said expanding element being adapted to be moved by collapsing said head, means integral with the shank at its free end for engagement by a tapered end portion of said axially movable expanding element to expand said shank portion adjacent to its free end and said shank being slit to provide for ease of lateral expansion thereof.

In testimony whereof, I have signed my name to this specification.

MOSES F. CARR.